United States Patent
Johnson et al.

(10) Patent No.: US 10,297,986 B2
(45) Date of Patent: May 21, 2019

(54) ARRESTING SYSTEM USABLE WITH ARC-RESISTANT ELECTRICAL ENCLOSURE

(71) Applicant: EATON CORPORATION, Cleveland, OH (US)

(72) Inventors: Wesley Byron Johnson, Fletcher, NC (US); David Glenn Woolard, Woodfin, NC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 641 days.

(21) Appl. No.: 14/840,649

(22) Filed: Aug. 31, 2015

(65) Prior Publication Data
US 2017/0063052 A1    Mar. 2, 2017

(51) Int. Cl.
*B65D 90/22*     (2006.01)
*H02B 1/30*      (2006.01)
*H02B 1/56*      (2006.01)
*H02B 13/025*    (2006.01)
*F17C 3/00*      (2006.01)

(52) U.S. Cl.
CPC ............ *H02B 1/306* (2013.01); *H02B 1/30* (2013.01); *H02B 1/565* (2013.01); *H02B 13/025* (2013.01)

(58) Field of Classification Search
CPC .......... H02B 1/306; H02B 1/30; H02B 1/565; H02B 13/025
USPC .................................. 220/88.1, 88.2, 560.01
See application file for complete search history.

(56) References Cited

U.S. PATENT DOCUMENTS

| | | | | |
|---|---|---|---|---|
| 4,484,690 A * | 11/1984 | Nash | ........................ | H05K 5/06 220/88.2 |
| 4,706,554 A * | 11/1987 | Baldino | ................... | F28F 25/12 261/109 |
| 5,710,402 A * | 1/1998 | Karnbach | .............. | H02B 1/565 218/157 |
| 5,749,948 A * | 5/1998 | Scholz | .................... | C09D 5/185 106/18.15 |
| 6,646,867 B1 * | 11/2003 | Tuttle | ...................... | G06F 1/182 174/16.1 |
| 7,413,024 B1 * | 8/2008 | Simontacchi | .......... | A62C 2/065 169/48 |
| 9,609,769 B2 * | 3/2017 | Kingston | ............. | H05K 5/0213 |

(Continued)

*Primary Examiner* — J. Gregory Pickett
*Assistant Examiner* — Niki M Eloshway
(74) *Attorney, Agent, or Firm* — Eckert Seamans (57) ABSTRACT

An arc-resistant electrical enclosure includes an arresting system that permits forced-air cooling of the interior region to occur during ordinary operation of the enclosure while resisting the flow of hot gases, plasma, and flames to the exterior of the electrical enclosure in an arc event or other event. The arresting system advantageously includes a louver apparatus and a cover apparatus that work in conjunction to resist the flow of gases, plasma, and flames to the exterior of the cabinet in an arc event. The louver apparatus includes louvers that can be moved from an open state to a closed state responsive to a predetermined fluid pressure impinging on the louvers. The cover apparatus includes a fire blocking panel that permits fluid flow therethrough during ordinary operation but which, responsive to a flame, initiates a transformation from one state to another state wherein the openings resist the communication of flames therethrough.

12 Claims, 9 Drawing Sheets

(56) References Cited

U.S. PATENT DOCUMENTS

| | | | | |
|---|---|---|---|---|
| 2004/0217072 A1* | 11/2004 | Bash | ............... | H05K 7/20718 211/26 |
| 2007/0097604 A1* | 5/2007 | Bruski | ............... | H02B 1/56 361/605 |
| 2011/0069452 A1* | 3/2011 | Campbell | ............... | H05K 7/20745 361/696 |
| 2014/0273799 A1* | 9/2014 | Erb | ............... | A62C 2/065 454/257 |
| 2016/0035518 A1* | 2/2016 | Pawar | ............... | H02B 1/56 218/157 |
| 2016/0295718 A1* | 10/2016 | Khzouz | ............... | H05K 5/0213 |

* cited by examiner

ARRESTING SYSTEM USABLE WITH ARC-RESISTANT ELECTRICAL ENCLOSURE

BACKGROUND

Field

The disclosed and claimed concept relates generally to electrical power distribution equipment and, more particularly, to an arresting system that is structured to resist the flow of flames and high pressure gases from an arc-resistant electrical enclosure.

Related Art

Many kinds of electrical power distribution equipment are known in the relevant art. Such electrical equipment includes switchgear cabinets and other enclosures that contain therein equipment such as circuit interrupters, switching devices, and the like, and such equipment is desirably situated within such enclosures because of the risk of electrical shock and other possible hazards.

Due to the potential for electrical arcing, some cabinets have been configured to be arc resistant, meaning that they are configured to resist dangerous materials exiting the cabinet in an arc event. Some enclosures, however, have the potential to generate significant heat therein during regular operation, and such enclosures have been configured to include passages that permit forced air to be circulated into and through the cabinets to provide cooling. Such forced-air arc-resistant electrical enclosures have been difficult to configure successfully since the passages that permit the forced air to flow into and through the interior of the electrical enclosure can also have a tendency to permit high pressure gases, plasma, and/or flames to flow out of the cabinet in the event of an arc. Improvements would thus be desirable.

SUMMARY

An improved arc-resistant electrical enclosure includes an improved arresting system that permits forced-air cooling of the interior region of the enclosure to occur during ordinary operation of the enclosure while resisting the flow of hot gases, plasma, and flames to the exterior of the electrical enclosure in an arc event or other event. The arresting system advantageously includes a louver apparatus and a cover apparatus that work in conjunction to resist the flow of gases, plasma, and flames to the exterior of the cabinet in an arc event. The louver apparatus includes louvers that can be moved from an open state to a closed slate responsive to a predetermined fluid pressure impinging on the louvers. The cover apparatus includes a fire blocking panel that permits fluid flow therethrough during ordinary operation but which, responsive to a flame, initiates a transformation from a first state to a second state wherein the openings resist the communication of flames therethrough.

Accordingly, an aspect of the disclosed and claimed concept is to provide an improved arresting system that is usable with an electrical enclosure and that permits forced-air cooling of the electrical enclosure during ordinary operation but that resists the flow of gases, plasma, and flames to the exterior of the electrical enclosure during an arc event.

Another aspect of the disclosed and claimed concept is thus to provide an improved arresting system structured for use at an aperture formed in a wall of an arc-resistant electrical enclosure. The arresting system can be generally stated as including a louver apparatus that can be generally stated to include a number of louvers and to be structured to be mounted to the wall and to be situated at least one of adjacent the aperture and within the aperture, the number of louvers being movable between an open state permitting fluid flow therethrough and a closed slate wherein the number of louvers resist fluid flow therethrough responsive to a predetermined fluid pressure impinging on the number of louvers, and a cover apparatus structured to be situated on at least one of the wall and the louver apparatus, the cover apparatus can be generally stated as including a fire blocking panel having a number of openings formed therein and being structured to overlie the aperture, the number of openings in a first state of the fire blocking panel permitting fluid flow therethrough and, responsive to a flame, the fire blocking panel initiating a transformation from the first state toward a second state wherein at least some of the number of openings resist the communication of flames therethrough.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
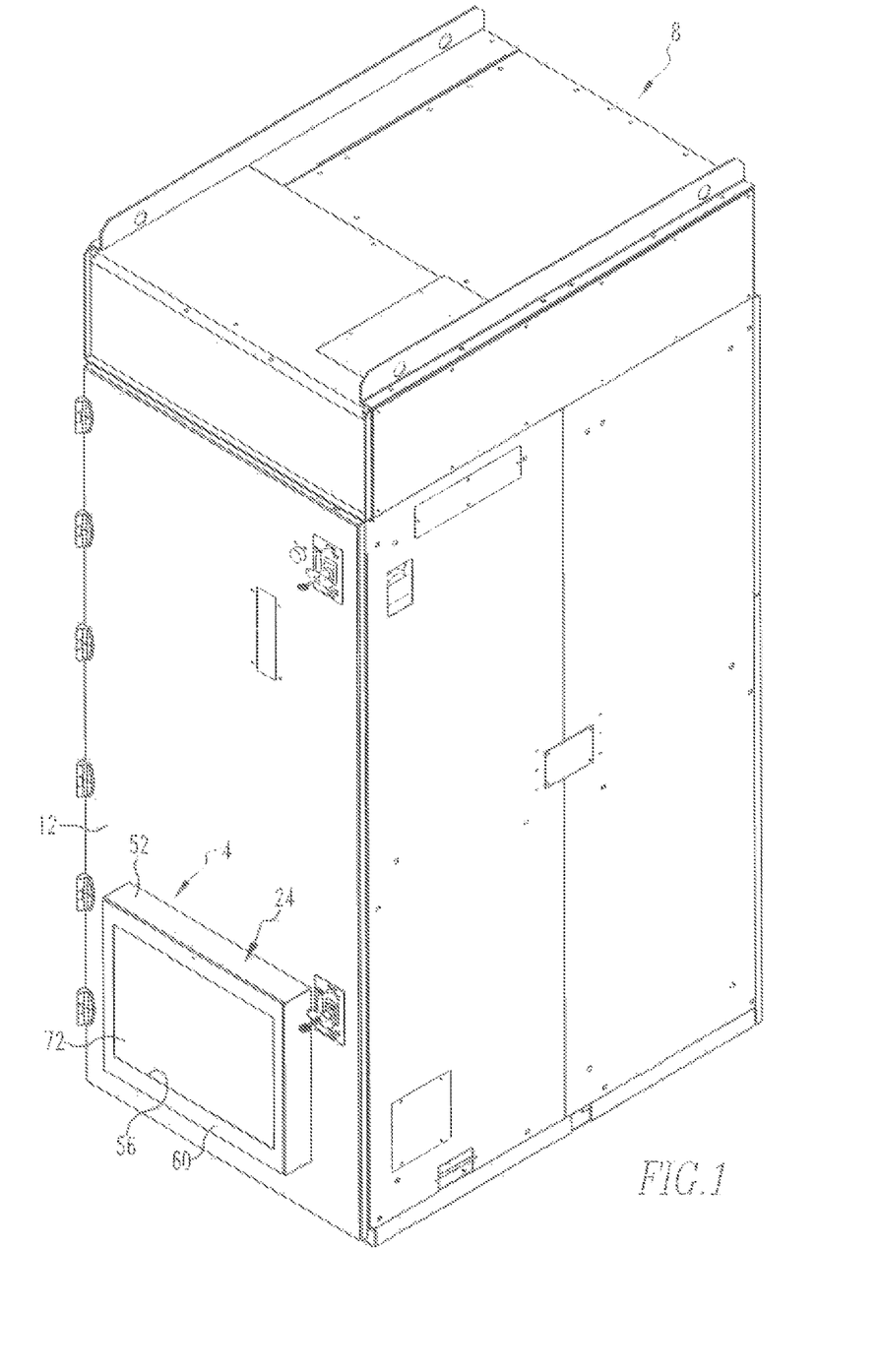
FIG. 1 is a perspective view of an improved electrical enclosure in accordance with the disclosed and claimed concept that includes an improved arresting system in accordance with the disclosed and claimed concept.
Figure 3:
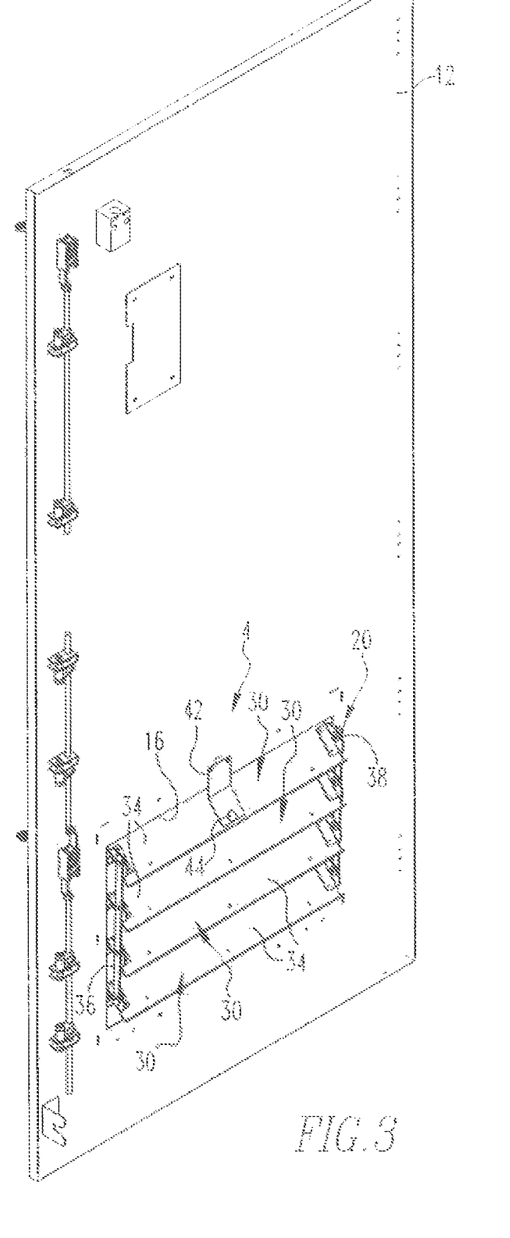
FIG. 3 is perspective view of the arresting system of FIG. 1 situated on the wall of the electrical enclosure but from inside the electrical enclosure.
Figure 4:
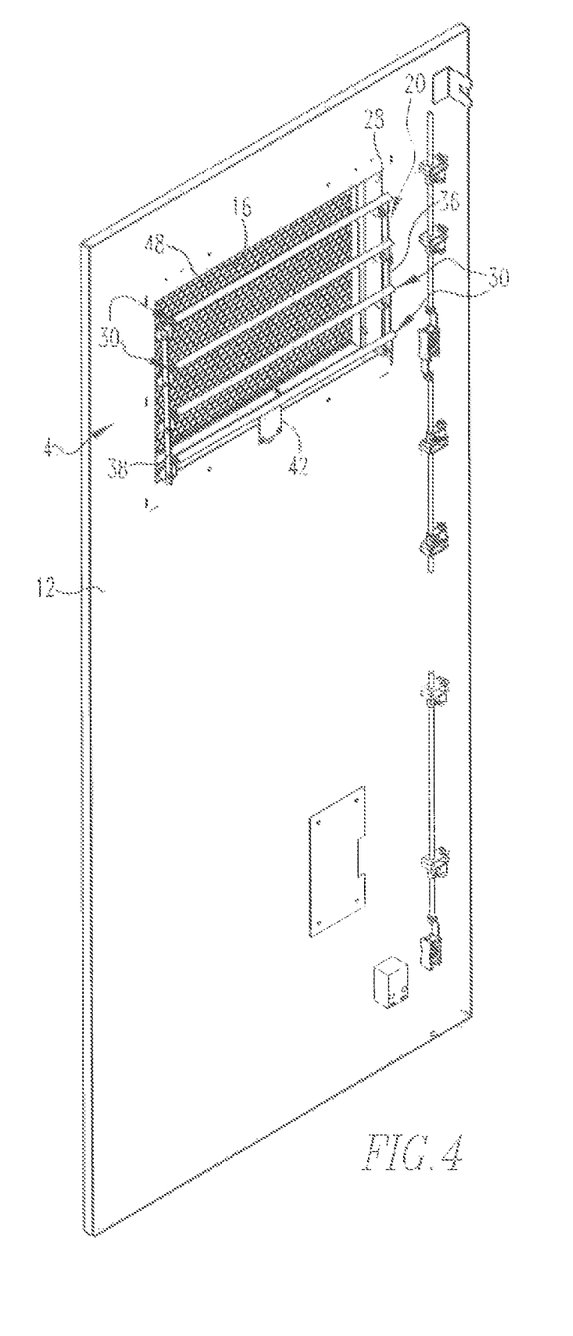
FIG. 4 is a view similar to FIG. 3, except depicting the arresting system from a different perspective.

An improved arresting system 4 in accordance with the disclosed and claimed concept is depicted generally in FIG. 1 as being situated on an improved electrical enclosure 8 that is likewise in accordance with the disclosed and claimed concept. The electrical enclosure 8 includes a wall 12 which, as can be seen in FIGS. 3 and 4, has an aperture 16 formed therein that the cresting system 4 overlies. The electrical enclosure 8 is an arc-resistant electrical enclosure that employs forced-air cooling to cool its interior, and the aperture 16 is an air inlet through which cooling air flows from the exterior of the electrical enclosure 8, as is depicted in FIG. 1 as being the region surrounding the electrical enclosure 8, and an interior region of the electrical enclosure 8.

In the depicted exemplary embodiment, the electrical enclosure 8 can be said to include the arresting system 4. It is understood, however, that in other embodiments not necessarily depicted herein, the arresting system 4 can be retrofit to an existing arc-resistant electrical enclosure to form the electrical enclosure 8 without departing from the present concept.

Figure 2:
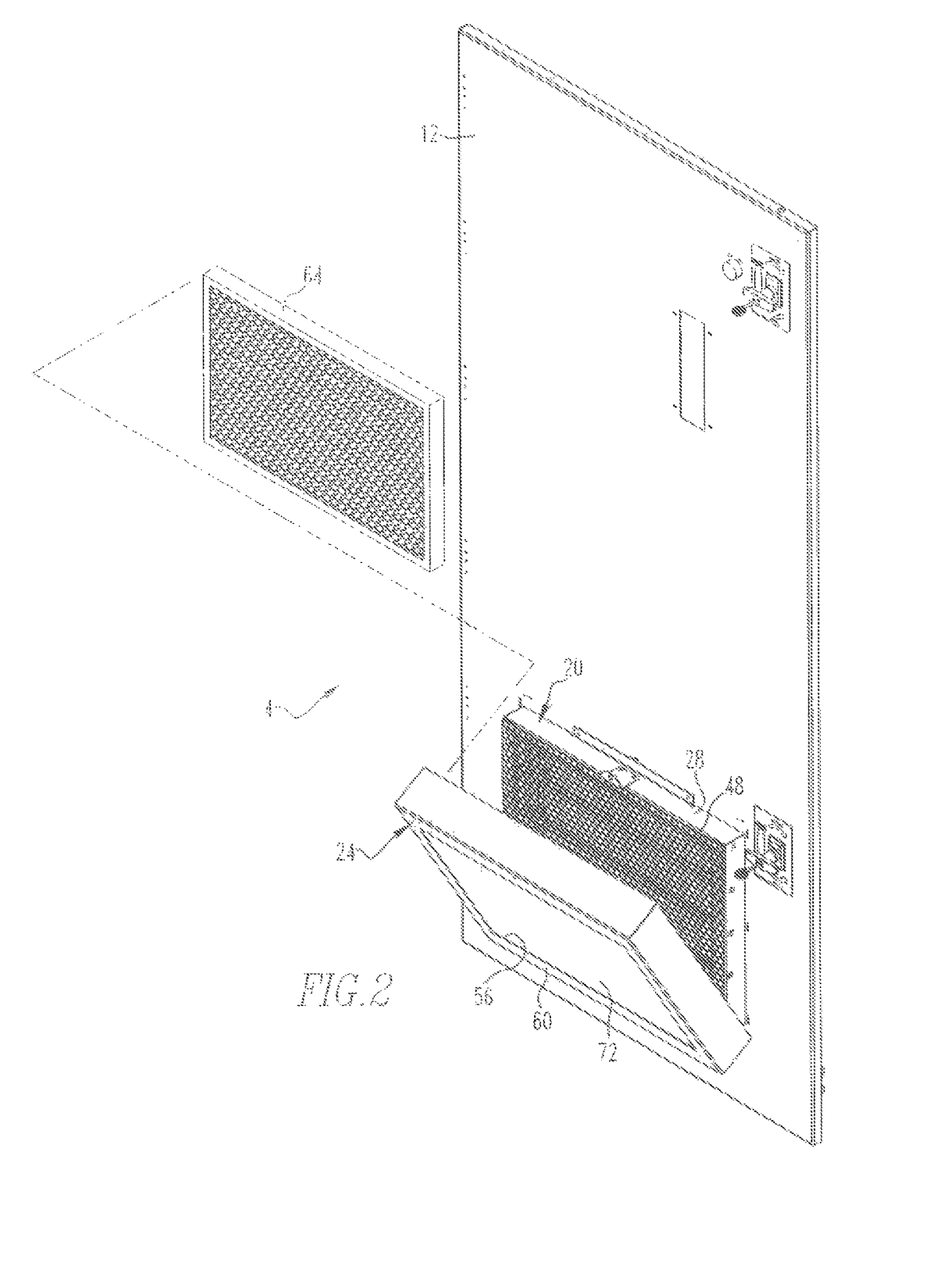
FIG. 2 is a partially exploded view of the improved arresting system of FIG. 1 situated on a wall of the electrical enclosure.

As is best shown in FIG. 2, the arresting system can be said to include a louver apparatus 20 and a cover apparatus 24. The exemplary louver apparatus 20 is affixed to the wall 12 in a position overlying the aperture 16 and being at least partially situated within the aperture 16. Further in the exemplary embodiment depicted herein, the cover apparatus 24 is pivotally connected to the wall 12 in a position where it can be situated adjacent and overlying both the louver apparatus 20 and the aperture 16 as in FIG. 1. In other embodiments not necessarily depicted herein, the cover apparatus 24 could be pivotally situated on the louver apparatus 20 itself without departing from the present concept.

Figure 5:
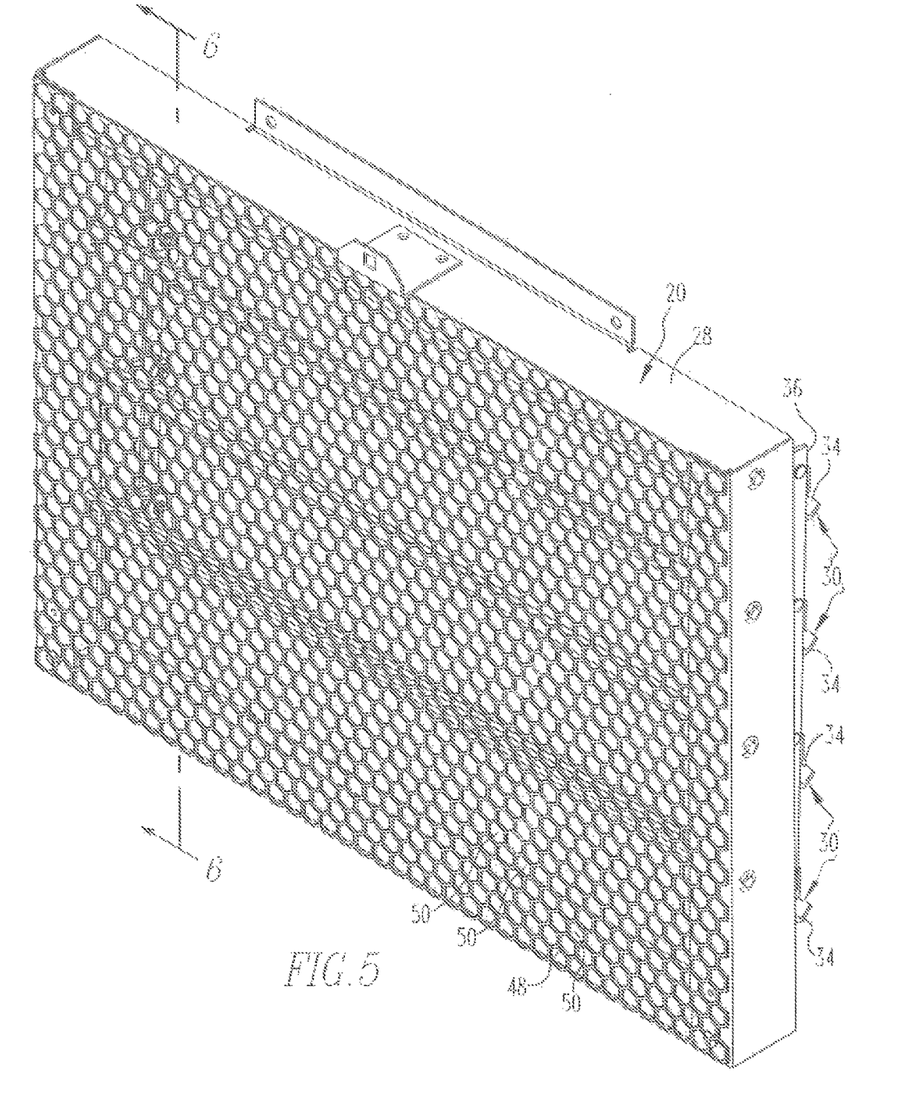
FIG. 5 is a perspective view of a louver apparatus of the arresting system of FIG. 1 in an open state.
Figure 6:
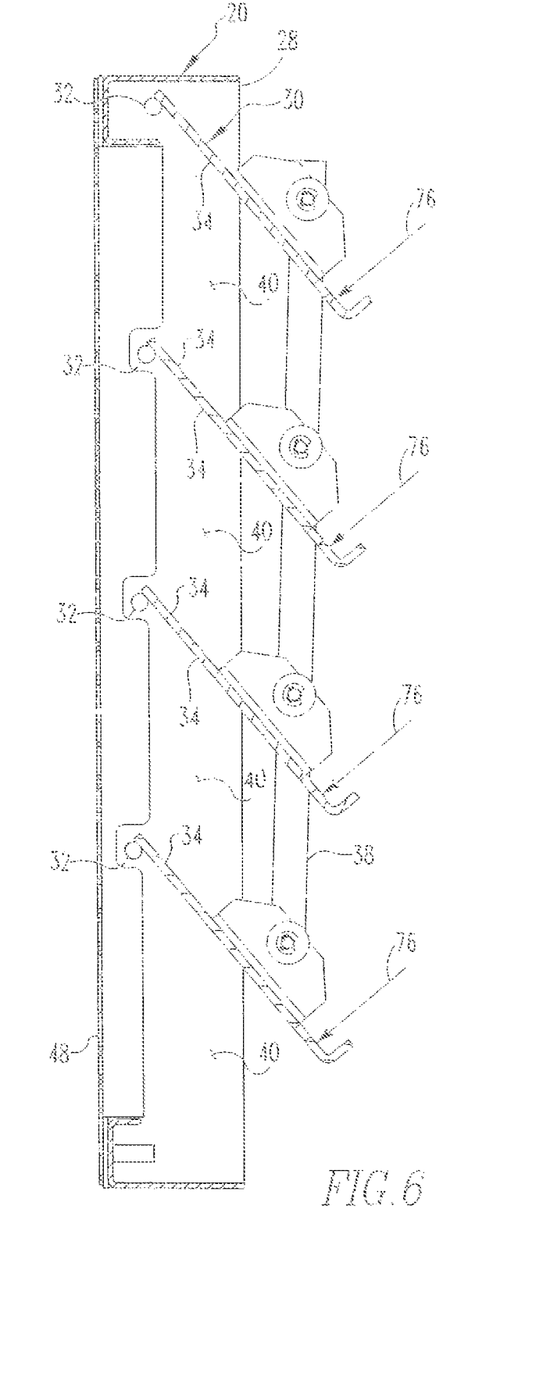
FIG. 6 is a sectional view as taken along line 6-6 of FIG. 5.
Figure 7:
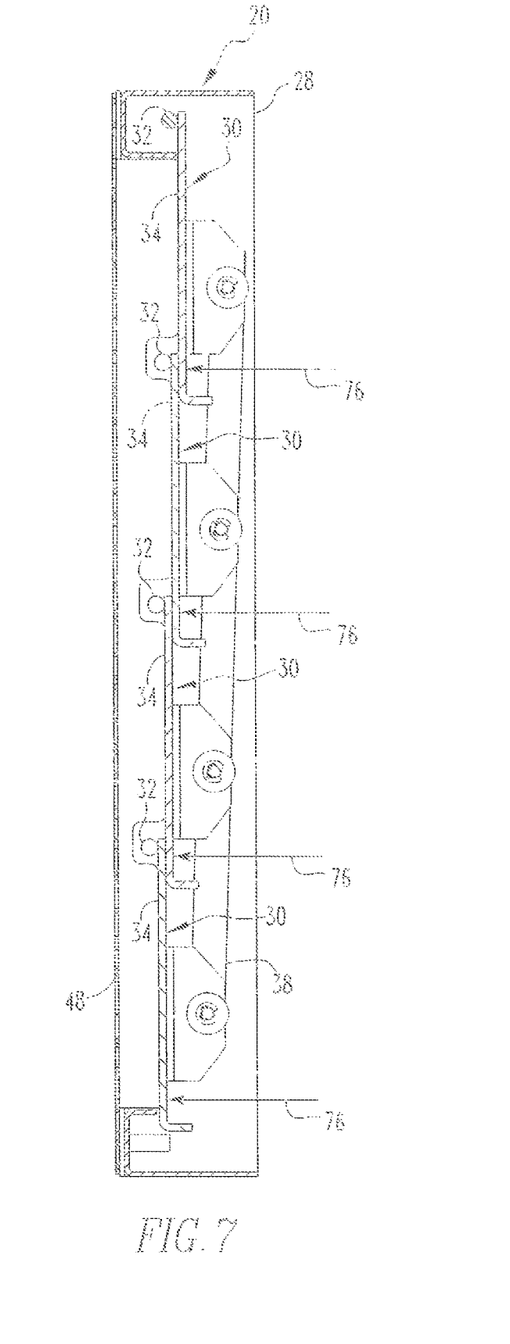
FIG. 7 is another sectional view similar to FIG. 6, except depicting the arresting system in a closed state.

As can be seen in FIGS. 2-7, the louver apparatus 20 can be said to include a frame 28 and a number of louvers 30. As employed herein, the expression "a number of" and variations thereof shall refer broadly to any non-zero quantity, including a quantity of one. Each louver 30 includes a base 32 that is in the form of an elongated rod whose ends are pivotally situated in holes formed in the frame 28. Each louver 30 further includes a leaf portion 34 that is affixed to the base 32 and that is thus pivotable with respect to the frame 28. The louver apparatus 20 further includes a first linkage 36 and a second linkage 38 that are affixed to the louvers 30 at opposite ends thereof and that enable movement of the louvers 30 to be coordinated to be movable between an open state such as is depicted in FIGS. 3-6 and a closed state such as is depicted in FIG. 7. When the louver apparatus 20 is in the open state, the louver apparatus 20 has a number of passages 40 that can be said to be situated between adjacent pairs of the louvers 30 through which fluid is permitted to flow to permit forced-air cooling of the electrical enclosure 8. One additional passage 40 is situated between one of the louvers 30 and the frame 28.

The louver apparatus 20 further includes a strut 42 and a connector 44 that are used to retain the louver apparatus 20 in the open state during ordinary operation of the electrical enclosure 8. More particularly, the strut 42 is depicted in FIGS. 3 and 4 as having an end thereof being affixed to the wall 12 in a location adjacent the aperture 16. FIG. 3 depicts the connector 44 extending between an opposite end of the strut 42 and one of the louvers 30 to thereby brace the connected louver 30 and thus the louver apparatus 20 in the open state. In accordance with the disclosed and claimed concept, the connector 44 is deformable and, more particularly, is breakable, responsive to a predetermined fluid pressure impinging on the louvers 30 from the inside of the electrical enclosure 8. This predetermined fluid pressure impinging on the surfaces of the louvers 30 is depicted generally at the numeral 76 in FIG. 6.

During ordinary operation of the electrical enclosure 8, and in the absence of an arc event, the connector 44 braces the uppermost (from the perspective of FIG. 3) louver 30 and thus the other louvers 30 via the first and second linkages 36 and 38 in the open state, thereby maintaining the passages 40 in the open condition that permits fluid to pass therethrough and into the interior of the electrical enclosure 8 to permit forced-air cooling of the interior of the electrical enclosure 8. However, upon the occurrence of an arc event wherein a predetermined fluid pressure 76 impinges on the louvers 30, the predetermined fluid pressure causes the connector 44 to fracture and thereby permit the louvers 30 to move away from the open position depicted generally in FIG. 3 and to move toward the closed position that is depicted generally in FIG. 7. In this regard, it is understood that such a fluid impinging on the louvers 30 typically would impinge on all of the louvers 30 and the combined force of such fluid impingement would be transferred via the first and second linkages 36 and 38 to the uppermost (from the perspective of FIG. 3) louver 30, and such combined force would cause the connector 44 to fracture. The connector 44 can be configured otherwise in other embodiments to suit other requirements of the particular application, as needed, without departing from the present concept.

As is best shown in FIG. 5, the louver apparatus 20 further includes a grille 48 that has a plurality of holes 50 formed therein that permit gases to flow therethrough. The grille 48 advantageously is affixed to the frame 28 and additionally provides stiffening to the frame 28 and thus to the louver apparatus 20 to resist unintended torquing and deformation of the louver apparatus 20 during installation or during daily operation of the electrical enclosure 8. The grille 48 also advantageously resists personnel from accessing the interior of the enclosure, such as by restricting reaching into the interior of the electrical enclosure 8 while changing, the particulate filter 72 during operation of the equipment.

The cover apparatus 24 is depicted in FIGS. 1 and 2 and includes a support 52 having a large open region 56 formed therein which permits gases to flow therethrough. The support is formed to include an upturned lip 60 that terminates at the open region 56.

Figure 8:
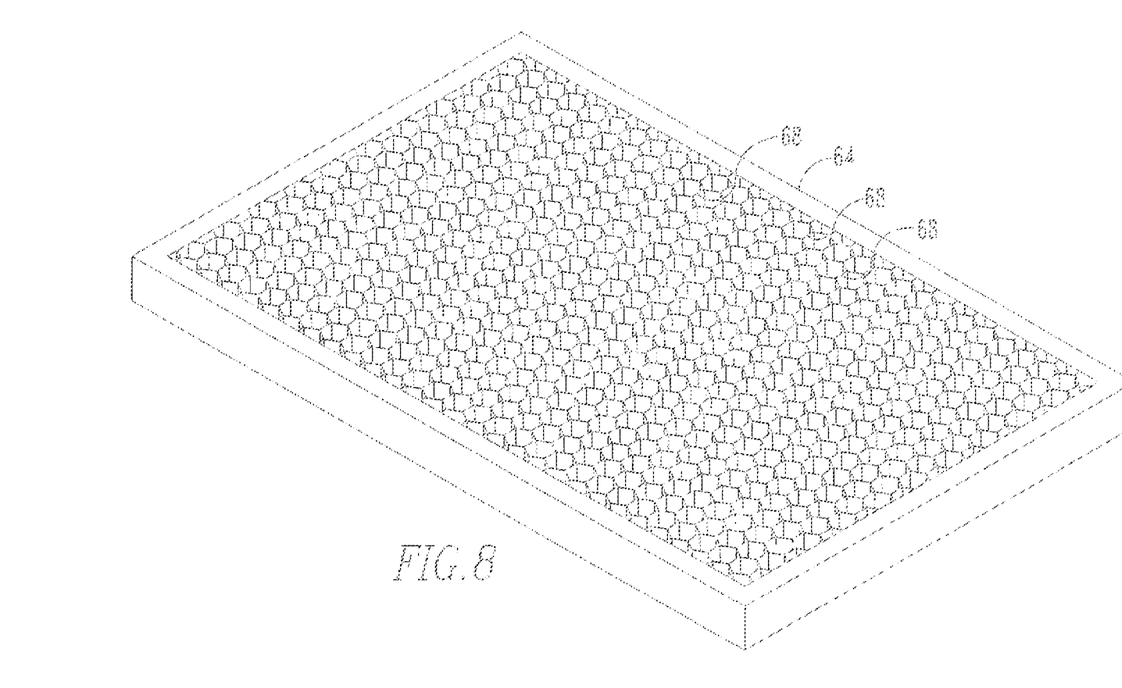
FIG. 8 is a schematic depiction of a fire blocking panel of the arresting system of FIG. 1 in a first state whereby its openings permit fluid flow therethrough.
Figure 9:
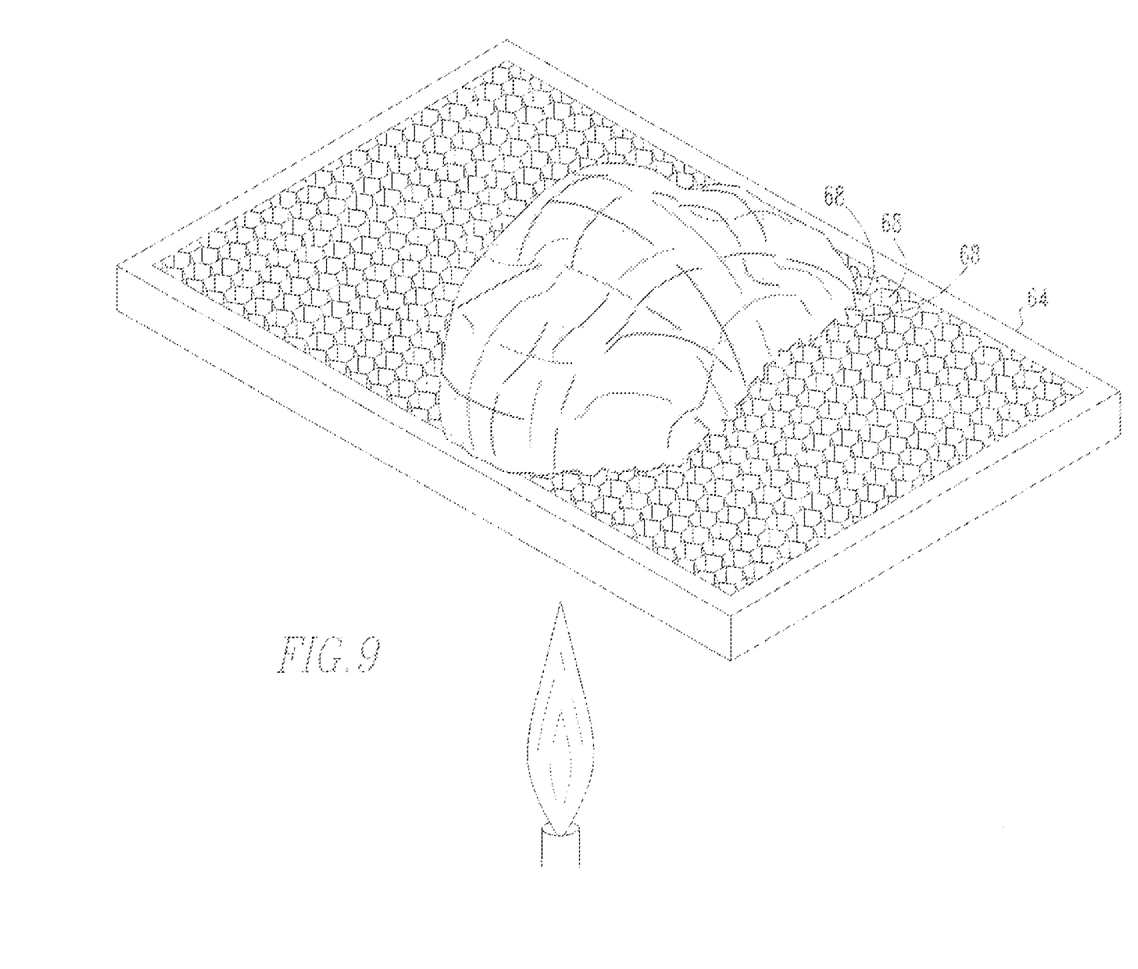
FIG. 9 is a view similar to FIG. 8, except depicting a transformation of the openings from the first state toward a second state responsive to a flame wherein at some of the openings resist the communication of flames therethrough.

As is further depicted in FIG. 2, the cover apparatus 24 additionally includes a fire blocking panel 64 that has a plurality of openings 68 formed therein which, in a first state, permit gases to flow therethrough during the aforementioned forced-air cooling of the interior of the electrical enclosure 8. In the presence of a flame in proximity to the fire blocking panel 64, however, the openings 68, at least those openings that are subjected to the flame, undergo a transformation from the first state that is depicted generally in FIG. 8 to a second state that is depicted, at least in part, in FIG. 9 where the openings 68 resist the from of flames therethrough. An example of such a fire blocking panel 64 is the PyroCide Vent Panel that is manufactured by Universal Air Filter Co. which is located at 1624 Suget Industrial Parkway of Suget, Ill. 62206, USA. Such an exemplary fire blocking panel 64 is formed of an aluminum honeycomb that includes a coating. In the presence of a flame, the coating expands or otherwise transforms to close the openings 68 to resist flames from traveling therethrough.

Advantageously, the cover apparatus 24 additionally includes a particulate filter 72 that is depicted in FIGS. 1 and 2 and which traps particulates such as dust and the like form flowing into the openings 68 of the fire blocking panel 64 and thereafter into the interior of the electrical enclosure 8 during the aforementioned forced-air cooling of the electrical enclosure 8. The particulate filter 72 thus avoids the coating of the fire blocking panel 64 within the openings 68 from becoming fouled by dust and other contaminants, which helps the fire blocking panel 64 to be in a condition wherein it can respond to a flame in the aforementioned fashion to resist the passage of flames through the openings 68. As an alternative, and depending upon the needs of the particular application, the particulate filter 72 and the fire blocking panel 64 could be configured to have their positions reversed, i.e., the particulate filter 72 could be interposed between the fire blocking panel 64 and the grille 42, without departing from the present concept. Further alternatives within the scope of the present concept will be apparent.

As can be understood from FIGS. 1 and 2, the particulate filter 72 is situated at the exterior of the electrical enclosure 3 directly adjacent the lip 60. When the cover apparatus 24 is pivoted to the position of FIG. 1 overlying the aperture 16, the lip 60 retains the particulate filter 72 in a position adjacent the fire blocking panel 64, with the fire blocking panel 64 being interposed between the particulate filter 72 and the grille 48 due to the lip 60.

During an arc event or other event that might produce flames along with high pressure gases or plasma, it is understood that such gases, plasma, and flame would have a tendency to flow toward the louver apparatus 20 as the high pressure gases formed by the arc event or other event lend to push the air that is within the interior of the electrical enclosure through the passages 40 and to the exterior of the electrical enclosure 8. When air or gases are caused to flow from the interior of the electrical enclosure 8 and through the passages 40 to the exterior of the electrical enclosure 8, such gases impinge, as is indicated at the numeral 76 in FIG. 6, on the louvers 30. In such a situation, the connector 44 will, at least initially, retain the louvers 30 in the open position that is depicted generally in FIG. 6. However, once the impingement 76 reaches a predetermined fluid pressure applied to the louvers 30, the combined forces transmitted through the louvers 30 and the first and second linkages 36 and 38 will cause the connector 44 to fracture which will permit the louvers 30 to rapidly move from the open position of FIG. 6 to the closed position of FIG. 7. In the closed position the louver apparatus 20 resists the flow of gases, plasma, and flame therethrough.

Approximately simultaneously with the aforementioned movement of the louver apparatus 20 from the open position of FIG. 6 toward the closed position of FIG. 7, high pressure gases can continue to flow through the passages 40 and thus through the openings 68 in the fire blocking panel 64 until the louver apparatus 20 has reached the closed position of FIG. 7. If such gases flowing through the openings 68 include any flames, the openings 68 that are subjected to the flame will undergo the aforementioned transformation, which will cause them to move from the first state of FIG. 8 toward the second state of FIG. 9.

The fire blocking panel 64 in the second stale of FIG. 5 is not necessarily configured to withstand an enormous gas pressure such as might exist within the interior of the electrical enclosure 8 during an arc event or other event. It is reiterated, however, that in the instance of a predetermined fluid pressure impinging on the louvers 30, the louvers 30 will be caused to move from the open state to the closed state, thereby resisting further fluid flow therethrough. As such, the fire blocking panel 64 need not itself resist the excessively high pressures that might be experienced within the interior of the electrical enclosure 8 inasmuch as the louver apparatus 20 in the closed position of FIG. 7 resists the flow of gases and flames therethrough. Stated otherwise, the louver apparatus 20 and the fire blocking panel 64 work in tandem and wife the use of relatively low cost components to both block the flame portion of the arc event through the use of the fire blocking panel 64 and to additionally resist the high pressure component of the arc event through the use of the louver apparatus 20. While the louver apparatus 20 can generally resist high pressure gases, it cannot necessarily resist the flow of all flames therethrough, especially prior to the louver apparatus reaching its closed state. On the other hand, while the fire blocking panel 64 can resist the flow of flames therethrough, it is not necessarily cable of withstanding excessive pressures. By providing the louver apparatus 20 in conjunction with the fire blocking panel 64, the arresting system 4 resists the flow of high pressure gases and flames to the exterior of the electrical enclosure 8, which is advantageous. Further advantages will be apparent to one of ordinary skill in the art.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An arresting system structured for use at an aperture formed in a wall of an arc-resistant electrical enclosure, the arresting system comprising:
   a louver apparatus comprising a number of louvers and being structured to be mounted to the wall and to be situated at least one of adjacent the aperture and within the aperture, the number of louvers being movable between an open state permitting fluid flow therethrough and a closed state wherein the number of louvers resist fluid flow therethrough responsive to a predetermined fluid pressure impinging on the number of louvers;
   a cover apparatus structured to be situated on at least one of the wall and the louver apparatus, the cover apparatus comprising a fire blocking panel having a number of openings formed therein and being structured to overlie the aperture, the number of openings in a first state of the fire blocking panel permitting fluid flow therethrough and, responsive to a flame, the fire blocking panel initiating a transformation from the first state toward a second state wherein at least some of the number of openings resist the communication of flames therethrough;
   wherein the louver apparatus further comprises a frame on which the number of louvers are movably disposed, the frame being structured to be mounted to at least one of the wall and the cover apparatus, the cover apparatus being receivable adjacent the frame to overlie the number of louvers;
   wherein the cover apparatus further comprises a support upon which the fire blocking panel is disposed, the support being receivable on the frame to situate the fire blocking panel in a position overlying the number of louvers; and
   wherein the louver apparatus further comprises a grille situated on the frame and having formed therein a plurality of holes that permit fluid flow therethrough, the fire blocking panel being situated adjacent the grille when the cover apparatus is situated on the at least one of the wall and the louver apparatus in a position overlying the number of louvers.

2. The arresting system of claim 1 wherein the support comprises a lip, the fire blocking panel being situated between the lip and the grille when the cover apparatus is situated in a position overlying the number of louvers.

3. The arresting system of claim 2 wherein the cover apparatus further comprises a particulate filter situated upon the support, the fire blocking panel being disposed between the particulate filter and the grille when the cover apparatus is situated on the at least one of the wall and the louver apparatus in a position overlying the number of louvers.

4. The arresting system of claim 1 wherein the louver apparatus further comprises a strut and a connector that are structured to be connected together, one of the strut and the connector being structured to be attached to one of the wall and a louver of the number of louvers in the open state, the other of the strut and the connector being structured to be attached to the other of the wall and the louver, the connector being deformable responsive to the predetermined fluid pressure impinging on the number of louvers to permit the number of louvers to move from the open state toward the closed state.

5. The arresting system of claim 1 wherein the cover apparatus is pivotably situated on one of the louver apparatus and the wall.

6. An arc-resistant electrical enclosure comprising the arresting system of claim 1, and further comprising:
   a cabinet comprising a wall having an aperture formed therein, the louver apparatus and the cover apparatus being situated on the wall and overlying the aperture, the arresting system being structured to resist the communication of a flame from an interior region of the cabinet to the exterior of the cabinet via the aperture.

7. The arc-resistant electrical enclosure of claim 6 wherein the louver apparatus is mounted to the wall, and wherein the cover apparatus is mounted to at least one of the louver apparatus and the wall.

8. An arresting system structured for use at an aperture formed in a wall of an arc-resistant electrical enclosure, the arresting system comprising:
   a louver apparatus comprising a number of louvers and being structured to be mounted to the wall and to be situated at least one of adjacent the aperture and within the aperture, the number of louvers being movable between an open state permitting fluid flow therethrough and a closed state wherein the number of louvers resist fluid flow therethrough responsive to a predetermined fluid pressure impinging on the number of louvers;
   a cover apparatus structured to be situated on at least one of the wall and the louver apparatus, the cover apparatus comprising a fire blocking panel having a number of openings formed therein and being structured to overlie the aperture, the number of openings in a first state of the fire blocking panel permitting fluid flow therethrough and, responsive to a flame, the fire blocking panel initiating a transformation from the first state toward a second state wherein at least some of the number of openings resist the communication of flames therethrough;
   wherein the louver apparatus further comprises a frame on which the number of louvers are movably disposed, the frame being structured to be mounted to at least one of the wall and the cover apparatus, the cover apparatus being receivable adjacent the frame to overlie the number of louvers;
   wherein the louver apparatus further comprises a strut and a connector that are structured to be connected together, one of the strut and the connector being structured to be attached to one of the wall and a louver of the number of louvers in the open state, the other of the strut and the connector being structured to be attached to the other of the wall and the louver, the connector being deformable responsive to the predetermined fluid pressure impinging on the number of louvers to permit the number of louvers to move from the open state toward the closed state; and
   wherein the connector is a frangible element that is structured to fracture responsive to the predetermined fluid pressure impinging on the number of louvers to permit the number of louvers to move from the open state toward the closed state.

9. The arresting system of claim 8 wherein the cover apparatus further comprises a support upon which the fire blocking panel is disposed, the support being receivable on the frame to situate the fire blocking panel in a position overlying the number of louvers.

10. The arresting system of claim 8 wherein the cover apparatus is pivotably situated on one of the louver apparatus and the wall.

11. An arc-resistant electrical enclosure comprising the arresting system of claim 8, and further comprising:
   a cabinet comprising a wall having an aperture formed therein, the louver apparatus and the cover apparatus being situated on the wall and overlying the aperture, the arresting system being structured to resist the communication of a flame from an interior region of the cabinet to the exterior of the cabinet via the aperture.

12. The arc-resistant electrical enclosure of claim 11 wherein the louver apparatus is mounted to the wall, and wherein the cover apparatus is mounted to at least one of the louver apparatus and the wall.

* * * * *